United States Patent [19]

Siefried et al.

[11] 4,283,453
[45] Aug. 11, 1981

[54] BIAXIALLY STRETCHED POLYPROPYLENE COMPOSITE FILM AND ELECTRICAL INSULATING FILM MADE THEREFROM

[75] Inventors: Walter Siefried; Siegfried Janocha, both of Wiesbaden; Günther Crass, Taunusstein, all of Fed. Rep. of Germany

[73] Assignee: Hoechst Aktiengesellschaft, Frankfurt am Main, Fed. Rep. of Germany

[21] Appl. No.: 98,549

[22] Filed: Nov. 29, 1979

[30] Foreign Application Priority Data

Nov. 29, 1978 [DE] Fed. Rep. of Germany ....... 2851557

[51] Int. Cl.³ .................. B32B 7/02; B32B 27/32; H01G 4/18
[52] U.S. Cl. .................................. 428/212; 156/229; 264/290.2; 428/379; 428/409; 428/461; 428/515; 428/516; 428/523; 428/910; 361/313; 361/323; 428/336; 428/335
[58] Field of Search ............... 428/461, 409, 379, 910, 428/212, 515, 516, 523, 336, 335; 361/313, 323; 156/229; 264/290.2

[56] References Cited

U.S. PATENT DOCUMENTS

| Re. 27,823 | 11/1973 | Cox | 361/318 |
|---|---|---|---|
| 3,380,868 | 4/1968 | Moser | 156/229 |
| 3,620,825 | 11/1971 | Lohmann | 428/516 |
| 3,622,375 | 11/1971 | Siebel | 428/516 |
| 3,761,772 | 9/1973 | Suzuki | 361/313 |
| 3,772,578 | 11/1973 | George | 428/379 |
| 3,806,775 | 4/1974 | Edman | 361/313 |
| 3,914,521 | 10/1975 | Beatty | 428/461 |
| 3,936,572 | 2/1976 | Mackenzie | 428/461 |
| 4,068,286 | 1/1978 | Iijima | 361/323 |
| 4,133,935 | 1/1979 | Dawson | 428/461 |

FOREIGN PATENT DOCUMENTS

| 223198 | 12/1957 | Australia | 361/323 |
|---|---|---|---|
| 1525 | 4/1979 | European Pat. Off. | 361/323 |
| 1802327 | 8/1969 | Fed. Rep. of Germany . | |
| 2601810 | 9/1976 | Fed. Rep. of Germany . | |
| 2722087 | 12/1977 | Fed. Rep. of Germany . | |
| 2004492 | 11/1969 | France . | |
| 2098190 | 3/1972 | France . | |
| 2212625 | 7/1974 | France . | |
| 2254430 | 7/1975 | France . | |
| 1487414 | 9/1977 | United Kingdom . | |

OTHER PUBLICATIONS

"Propylene", *Applied Plastics*, Nov. 1961, p. 62.

*Primary Examiner*—Ellis P. Robinson
*Attorney, Agent, or Firm*—Schwartz, Jeffery, Schwaab, Mack, Blumenthal & Koch

[57] ABSTRACT

Disclosed is a biaxially stretched, composite polypropylene film suitable for use as an electrical insulating film, comprising a first layer comprising a first propylene polymer and having a maximum roughness height $R_z$ of its exposed surface of about 0.5 μm, and a second layer contiguous to the first layer comprising a second propylene polymer having a composition different from the first propylene polymer and having a roughness height $R_z$ on its exposed surface ranging between about 0.2 μm and 0.4 μm, with the composite film having a modulus of elasticity of at least about 2000 N/mm² in all directions of the plane of the film and a DC dielectric strength of at least about 650 V/μm. Also disclosed is a capacitor comprised of a plurality of these composite films having a metal surface layer and being laminated with one another.

17 Claims, 2 Drawing Figures

BIAXIALLY STRETCHED POLYPROPYLENE COMPOSITE FILM AND ELECTRICAL INSULATING FILM MADE THEREFROM

BACKGROUND OF THE INVENTION

The present invention relates to a biaxially stretched polypropylene film, and more especially to a composite biaxially stretched polypropylene film comprising two layers and having one surface which is rougher than the other surface. In a metallized form, the film is used for the manufacture of capacitors.

Biaxially stretched polypropylene films are employed as sealable films for packaging purposes; see, e.g., German Auslegeschrift No. 1,694,547, and they are also used for electrical applications, e.g., as metallized films for the manufacture of capacitors.

A generally known problem encountered in the processing of smooth polypropylene films is their blocking propensity, for example, in the course of metallizing, cutting or winding up the films. In particular, these films cannot be used in high-speed capacitor winding machines. To solve this problem, polypropylene films with rough surfaces are produced, and these can be processed without difficulty.

German Offenlegungsschrift No. 2,740,237 discloses a process for the manufacture of a polypropylene film with rough surfaces, in which the desired roughness is obtained by choosing predetermined crystallizing temperatures and cooling periods.

German Offenlegungsschrift No. 2,553,693 describes a process for the manufacture of rough polypropylene films, in which a fibrillar network structure is built up on the film surface by applying specific stretching temperatures and stretching conditions. This network structure has the purpose of providing a better absorption of the insulating oils used in the production of capacitors.

A similar process for preparing rough electrical insulating films has been disclosed in German Offenlegungsschrift No. 2,722,087. Also in this case, special stretching conditions and stretching temperatures are employed to produce $\beta$-shaped crystals in the film surface. These crystals have an average diameter exceeding 7 $\mu$m, and the density of distribution of the crystals must amount to more than 5,000 crystals per cm$^2$ (in the case of spherulites) and to more than 1,000 crystals per cm$^2$ (in the case of rod-shaped crystals). The rough surface likewise serves to enhance the absorptivity toward insulating oils, thus preventing failures or breakdowns due to corona discharges in the capacitor.

German Offenlegungsschrift No. 2,601,810 is also concerned with an improvement of the impregnation of capacitor rolls. For that purpose, particular temperature conditions are chosen in the manufacture of tubular films, as a result of which the films are roughened, i.e., spherulites of the type III crystalline structure are generated.

Due to the steep characteristic curve of the kinetics of crystallization, however, the processes mentioned have the common disadvantage that they must adhere to very special process conditions, so that they are technically rather involved and extremely susceptible to failures caused by external influences, e.g., by air convection. In addition, in the films manufactured according to these processes, attention is principally paid to the absorptivity toward insulating oils and less to the electrical properties.

As is known, the electrical properties of biaxially stretched polypropylene films depend strongly on the structure of their surface. On the one hand, ideal electrical properties are observed in polypropylene films having very smooth and planar parallel surfaces, but these films give rise to the above-described problem of blocking during processing. On the other hand, the good electrical properties of polypropylene films decrease with an increasing roughness of their surfaces. It is above all the so-called "life test", i.e., the loss of capacitance of a capacitor as a function of time [$\Delta C/C = f(t)$], which reveals a clear dependence on surface roughness.

Furthermore, non-uniform coating thicknesses are produced when vacuum metallizing polypropylene films having rough surfaces, because the metal coating is thinner at the sides of the surface peaks. As a result, a so-called "metal separation" occurs to an increasing degree in the capacitor, which causes a reduction of capacitance or a failure of the capacitor.

SUMMARY OF THE INVENTION

It is therefore an object of the present invention to provide an improved biaxially stretched polypropylene film.

A further object of the invention resides in providing a biaxially stretched polypropylene film which exhibits good electrical properties and extended life test values.

It is a further object of the invention to provide such a film which does not block during processing and which may, therefore, also be used in high-speed capacitor winding machines.

Still another object of the invention is the provision of an improved metallized polypropylene film.

One further object of the invention resides in the provision of an improved capacitor made with the improved polypropylene film of the invention.

In accomplishing these objects, there has been provided in accordance with the present invention a biaxially stretched, composite polypropylene film suitable for use as an electrical insulating film, comprising a first layer comprising a first propylene polymer and having a maximum roughness height $R_z$ of its exposed surface of about 0.15 $\mu$m, and a second layer contiguous to the first layer comprising a second propylene polymer having a composition different from the first propylene polymer and having a roughness height $R_z$ on its exposed surface ranging between about 0.2 $\mu$m and 0.4 $\mu$m. The composite film has a modulus of elasticity of at least about 2000 N/mm$^2$ in all directions of the plane of the film and a DC dielectric strength of at least about 650 V/$\mu$m. Preferably, the first layer comprises more than about 50% of the total thickness of the composite film.

In accordance with another aspect of the present invention, there is provided a composite polypropylene film as above-defined, further comprising a layer of metal, preferably having a thickness ranging from about 20 nm to 50 nm and a resistivity of from about 1 to 5$\Omega/\square$, on one of its exposed surfaces.

In accordance with yet another aspect of the invention, there has been provided a capacitor comprised of a plurality of the metallized composite polypropylene films laminated with one another. Preferably, the capacitor is a wound capacitor.

Further objects, features and advantages of the present invention will become apparent from the detailed description of preferred embodiments which follows, when considered together with the attached figures of drawing.

DETAILED DESCRIPTION OF PREFERRED EMBODIMENTS

Figure 1:
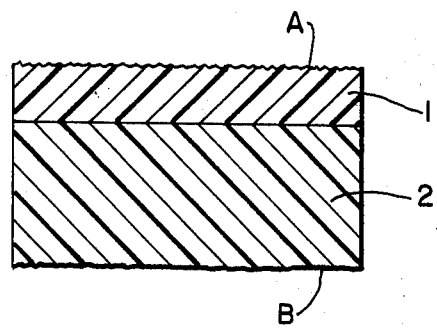
FIG. 1 is a cross-sectional view through a composite polypropylene film according to the invention.
Figure 2:
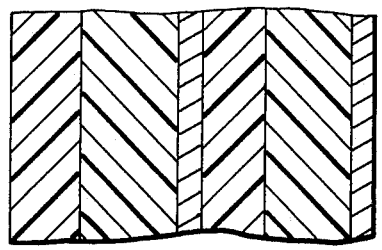
FIG. 2 illustrates a section of a capacitor produced from a metallized polypropylene film according to the invention.

The present invention provides a biaxially stretched polypropylene film for use as an electrical insulating film, which has the characterizing feature that it comprises two layers of different compositions and that one surface has a maximum roughness height $R_z$ of 0.15 μm and the other surface has a roughness height $R_z$ ranging between about 0.2 and 0.4 μm. The film has a modulus of elasticity of >2,000 N/mm² in all directions of the plane of the film and a DC dielectric strength of >650 V/μm.

The roughness height $R_z$ is to be understood as meaning the arithmetical average of 5 $R_t$ measurements, with $R_t$ indicating the distance between the highest peak and the deepest valley of the surface within the selected measuring section (10 mm).

Within the scope of the present invention, those films are preferred in which the layer having the smooth surface comprises more than about 50% of the total thickness of the composite material. The polymers used for the layer having the rougher surface are, in particular, block copolymers or mixtures of two or more polymers. Block copolymers composed of from about 80 to 99% by weight of propylene and from about 20 to 1% by weight of styrene, methyl methacrylate or ethylene, or alternatively polymer mixtures composed of from about 80 to 99% by weight of polypropylene and from about 20 to 1% by weight of polystyrene, polymethyl methacrylate or high density or low density polyethylene have proved particularly suitable in practice.

The composite films may be manufactured according to any of the known processes, e.g., by melt coating or coextrusion with subsequent biaxial stretching, similar to the processes used in the manufacture of biaxially stretched single layer polypropylene films.

Normally, stretching is performed in the longitudinal direction at a stretching ratio of between 4.0 and 7.0, preferably of between 4.5 and 6.0 and at a temperature of between 125° C. and 160° C., preferably of between 135° C. and 150° C., followed by stretching in the transverse direction at a stretching ratio of between 7.0 and 11.0, preferably of between 8.0 and 10.0 and at a temperature of between 145° C. and 175° C., preferably of between 150° and 170° C., followed by heat setting at a temperature of between 140° C. and 170° C., preferably of between 145° C. and 165° C. and subsequent cooling of the composite film.

By using different polymers which have different melting points and different stretchabilities and differences in the roughness heights can be obtained.

For use as capacitor films, the films are metallized or their smoother surface, with aluminum being preferred for metallizing. Usually, the metal coating has a thickness in the range between about 20 nm and 50 nm, corresponding to from about 1 to 5 Ω/□.

Surprisingly, it has been found that the electrical values remained unchanged (relative dielectric constant as a function of temperature) or were even improved (volume resistivity and dielectric loss factor, both as a function of temperature) as compared with a smooth polypropylene film, which is normally to be regarded as ideal, although, according to the explanation given at the onset, the opposite would have to be expected.

Even in pure polypropylene films, for example, a considerable decrease of volume resistivity occurred already at a temperature of about 70° C., whereas in the films according to the invention, such a decrease was not observed until a temperature of about 100° C. was reached.

In the following, the invention will be explained in more detail with reference to the illustrative examples given, which are, however, not intended to in any way limit the subject invention.

EXAMPLES 1, 2 AND 3

Composite films were prepared by coextrusion (Examples 1 and 2) and by melt coating (Example 3), and were subsequently biaxially stretched and heat set. The total thickness of these films was 12 μm. The thicker layer (8 μm) with the smoother surface was composed of polypropylene having an ash content below 100 ppm. The layer with the rougher surface was composed of polypropylene containing 3, 6 and 9% of low density polyethylene, respectively. The corresponding measured values are listed in Table 1 below.

TABLE 1

|  | EXAMPLE 1 | EXAMPLE 2 | EXAMPLE 3 |
| --- | --- | --- | --- |
| Proportion of polyethylene (% by weight) | 3.0 | 6.0 | 9.0 |
| Ultimate tensile strength (N/mm²) | | | |
| long. | 210 | 200 | 200 |
| transv. | 350 | 360 | 360 |
| Modulus of elasticity (N/mm²) | | | |
| long. | 2.850 | 2.850 | 2.950 |
| transv. | 6.000 | 5.350 | 5.350 |
| $R_z$ (μm) | | | |
| smooth surface | 0.120 | 0.120 | 0.120 |
| rough surface | 0.280 | 0.300 | 0.350 |
| Volume resistivity (Ω × cm) | | | |
| 25° C. | $4 \times 10^{19}$ | $4 \times 10^{19}$ | $3.5 \times 10^{19}$ |
| 100° C. | $4 \times 10^{19}$ | $3.6 \times 10^{19}$ | $3.2 \times 10^{19}$ |

As a means of comparison, the volume resistivity values were measured on a normal smooth polypropylene film ($R_z = 0.120$ μm). At 25° C. the volume resistivity was $3 \times 10^{19}$, and it dropped to $7 \times 10^{17}$ at 100° C.

The smooth surfaces of the films according to the invention were vacuum metallized with aluminum at a coating thickness of 25 nm.

From the metallized films, 15 μF capacitors were wound, which were placed in aluminum cases and molded with a resin. The capacitors so prepared were subjected to capacitance measurements at 85° C. and 50 Hz using a capacitance bridge (according to Schering). They were kept live for 500 hours at 365 V. The loss of capacitance (ΔC/C) was then determined in percent. The measured values are listed in Table 2.

TABLE 2

| CAPACITORS MANUFACTURED FROM BIAXIALLY STRETCHED POLYPROPYLENE FILMS: | Δ C/C AFTER 500 HOURS | DC DIELECTRIC STRENGTH (V/μm) |
|---|---|---|
| 1. smooth film $R_z = 0.110$ μm comparative examples | 1.8% | 730 |
| 2. rough film according to German Offenlegungsschrift No. 2,740,237 | 4.2% | 700 |
| 3. film according to invention (Example 1) | 2.5% | 690 |

As may be seen from the values given in Table 2, the capacitors manufactured from the films according to the invention have a good DC dielectric strength, and their loss of capacitance is substantially lower than in the capacitors made from the conventional rough film.

The recordings were made by means of a Gould Topographer.

FIG. 1 depicts in a schematic side view the differences in roughness between the two film layers. The layer marked with the reference numeral 1 represents the modified layer, and layer 2 is the pure polypropylene layer.

Surface A of the film according to the invention is clearly rougher than surface B, whereas in the films of the comparative examples, there are either no differences at all or only slight differences between the surfaces A and B.

What is claimed is:

1. A biaxially stretched, composite polypropylene film suitable for use as an electrical insulating film, comprising
   a first layer comprising a first propylene polymer and having a maximum roughness height $R_z$ of its exposed surface of about 0.15 μm, and
   a second layer contiguous to said first layer comprising a second propylene polymer having a composition different from said first propylene polymer and having a roughness height $R_z$ on its exposed surface ranging between about 0.2 μm and 0.4 μm,
   said composite film being biaxially stretched and having a modulus of elasticity of at least about 2000 N/mm² in all directions of the plane of the film and a DC dielectric strength of at least about 650 V/μm, said composite film having been produced by the steps consisting essentially of joining said first and second layers together and subjecting the resulting composite film to biaxial stretching, and wherein the differences in said first and second propylene polymers are sufficient to produce said different roughness heights during said biaxial stretching.

2. A film according to claim 1, wherein said first layer comprises more than about 50% of the total thickness of the composite film.

3. A film according to claim 1 or claim 2, wherein said second layer comprises a propylene block copolymer.

4. A film according to claim 1 or claim 2, wherein said second layer comprises a mixture of a propylene polymer with at least one other polymer.

5. A film according to claim 4, wherein said polymer mixture comprises from about 80 to 99% by weight of polypropylene and from about 20 to 1% by weight of polystyrene, polymethyl methacrylate or high density or low density polyethylene.

6. A film according to claim 3, wherein said block copolymer comprises from about 80 to 99% by weight of propylene and from about 20 to 1% by weight of styrene, methyl methacrylate or ethylene.

7. A film according to claim 1, further comprising a layer of metal on one of its exposed surfaces.

8. A film according to claim 7, wherein said metal layer has a thickness ranging from about 20 nm to 50 nm and a resistivity of from about 1 to 5Ω/□.

9. A film according to claim 8, wherein said metal layer is on the exposed surface of said first propylene polymer layer.

10. A film according to claim 9, wherein said metal comprises aluminum.

11. A capacitor, comprising a plurality of composite polypropylene films as defined by claim 7 laminated with one another.

12. A film according to claim 1, wherein said biaxial stretching comprises longitudinal stretching at a stretching ratio of between about 4 and 7 and transverse stretching at a stretching ratio of between about 7 and 11.

13. A film according to claim 12, wherein said biaxial stretching comprises longitudinal stretching at a stretching ratio of between about 4.5 and 6 and transverse stretching at a stretching ratio of between about 8 and 10.

14. A film according to claim 12, wherein said longitudinal stretching is carried out at a temperature between about 125° C. and 160° C. and said transverse stretching is carried out at a temperature between about 145° C. and 175° C.

15. A film according to claim 14, wherein said biaxially stretched film is heat set at a temperature between about 140° C. and 170° C. after said biaxially stretching.

16. A film according to claim 5, wherein said second polypropylene polymer comprises a blend of polypropylene and low density polyethylene.

17. A film according to claim 16, wherein said blend contains between about 3% and 9% of low density polyethylene.

* * * * *

UNITED STATES PATENT AND TRADEMARK OFFICE
CERTIFICATE OF CORRECTION

PATENT NO. : 4,283,453
DATED : August 11, 1981
INVENTOR(S) : Walter Seifried et al.

It is certified that error appears in the above—identified patent and that said Letters Patent is hereby corrected as shown below:

On The Title Page:

Kindly correct the spelling of the first inventor from "SIEFRIED ET AL" to -- SEIFRIED ET AL --.

in lines designated as (19) and (75).

Signed and Sealed this

Thirteenth Day of October 1981

[SEAL]

Attest:

GERALD J. MOSSINGHOFF

Attesting Officer

Commissioner of Patents and Trademarks

UNITED STATES PATENT OFFICE
CERTIFICATE OF CORRECTION

Patent No. 4,283,453     Dated August 11, 1981

Inventor(s) Walter SEIFRIED, Siegfried JANOCHA and Guenther CRASS

It is certified that error appears in the above-identified patent and that said Letters Patent are hereby corrected as shown below:

IN THE SPECIFICATION:

Column 3, line 62, kindly delete "and" (second occurrence) and insert instead -- the --.

IN THE ABSTRACT:

Line 5, kindly delete "0.5 µm" and insert instead -- 0.15 µm --.

Signed and Sealed this

Tenth Day of November 1981

[SEAL]

Attest:

GERALD J. MOSSINGHOFF

Attesting Officer     Commissioner of Patents and Trademarks